(12) United States Patent
Ammon et al.

(10) Patent No.: US 8,355,840 B2
(45) Date of Patent: *Jan. 15, 2013

(54) INFLUENCING DEVICE FOR INFLUENCING AN ACTIVE CHASSIS SYSTEM OF A VEHICLE

(75) Inventors: Dieter Ammon, Remseck (DE); Friedrich Boettiger, Esslingen (DE); Ralph Streiter, Stuttgart (DE)

(73) Assignee: Daimler AG, Stuttgart (DE)

( * ) Notice: Subject to any disclaimer, the term of this patent is extended or adjusted under 35 U.S.C. 154(b) by 806 days.

This patent is subject to a terminal disclaimer.

(21) Appl. No.: 12/438,241

(22) PCT Filed: Aug. 2, 2007

(86) PCT No.: PCT/EP2007/006844
§ 371 (c)(1),
(2), (4) Date: Sep. 1, 2009

(87) PCT Pub. No.: WO2008/022697
PCT Pub. Date: Feb. 28, 2008

(65) Prior Publication Data
US 2010/0049394 A1    Feb. 25, 2010

(30) Foreign Application Priority Data
Aug. 22, 2006   (DE) .......................... 10 2006 039 353

(51) Int. Cl.
*B60G 17/165* (2006.01)
(52) U.S. Cl. .......................................... 701/37; 701/36

(58) Field of Classification Search ................... 701/29, 701/36–38, 48; 73/11.04, 11.05, 11.07, 117.01, 73/117.02, 117.03, 11.4; 434/375; 280/5.512, 280/5.51, 5.515
See application file for complete search history.

(56) References Cited

U.S. PATENT DOCUMENTS
4,657,280 A    4/1987  Ohmori
(Continued)

FOREIGN PATENT DOCUMENTS
DE    41 19 494 A1    1/1992
(Continued)

OTHER PUBLICATIONS

International Search Report dated Nov. 30, 2007 with an English translation of the pertinent portions (Five (5) pages).
(Continued)

*Primary Examiner* — Yonel Beaulieu
(74) *Attorney, Agent, or Firm* — Crowell & Moring LLP

(57) ABSTRACT

An influencing device for influencing an active chassis that includes a plurality of controllable spring or damper units of a vehicle is provided. The influencing device includes a roadway sensor that produces sensor data relating to a roadway located in front of the vehicle in a direction of travel, the sensor data being used to acquire a roadway profile. The influencing device also includes a pilot control unit that determines, as a function of the acquired roadway profile, a pilot control variable that is used to adapt the setting of the spring or damper units to the acquired roadway profile. An input signal for a vehicle body control system, which is used to control the position of the vehicle body, is calculated on the basis of the pilot control variable.

20 Claims, 3 Drawing Sheets

U.S. PATENT DOCUMENTS

Figure 1:
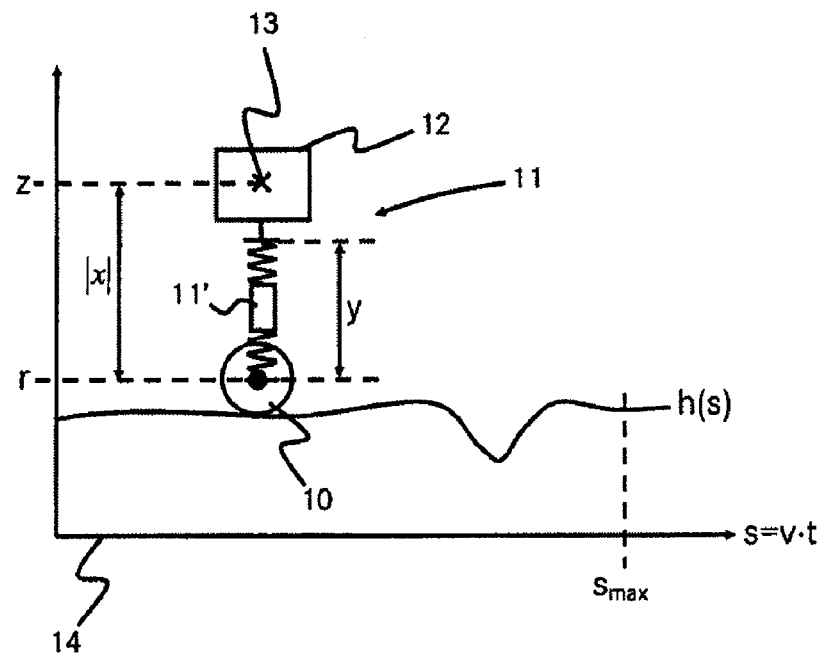

| | | | |
|---|---|---|---|
| 5,432,700 A | 7/1995 | Hrovat et al. | |
| 5,450,322 A | 9/1995 | Tanaka et al. | |
| 6,233,510 B1 | 5/2001 | Platner et al. | |
| 7,926,821 B2 * | 4/2011 | Zuber | 280/5.511 |
| 2010/0010710 A1 * | 1/2010 | Kopp et al. | 701/38 |

FOREIGN PATENT DOCUMENTS

| | | |
|---|---|---|
| EP | 1 449 688 A2 | 8/2004 |
| JP | 3-178814 A | 8/1991 |
| JP | 4-339010 A | 11/1992 |
| JP | 4-342612 A | 11/1992 |
| JP | 5-16636 A | 1/1993 |
| JP | 5-262117 A | 10/1993 |
| JP | 5-262118 A | 10/1993 |
| JP | 05319054 A | 12/1993 |
| JP | 9-226338 A | 9/1997 |
| JP | 11-42918 A | 2/1999 |
| JP | 2004-249976 A | 9/2004 |
| JP | 2005-81913 A | 3/2005 |
| JP | 2010-501388 A | 1/2010 |

OTHER PUBLICATIONS

Form PCT/ISA/220 and Form PCT/ISA/237 dated Nov. 30, 2007 with partial English translation (Twelve (12) pages).

* cited by examiner

INFLUENCING DEVICE FOR INFLUENCING AN ACTIVE CHASSIS SYSTEM OF A VEHICLE

CROSS REFERENCE TO RELATED APPLICATIONS

This application is a national stage of PCT International Application No. PCT/EP2007/006844, filed Aug. 2, 2007, which claims priority under 35 U.S.C. §119 to German Patent Application No. 10 2006 039 353.8, filed Aug. 22, 2006, the entire disclosures of which are herein expressly incorporated by reference.

This application is related to U.S. patent application Ser. No. 12/438,274 "Device and Method for Influencing the Spring Force Characteristic of an Active Chassis of a Motor Vehicle" and U.S. patent application Ser. No. 12/438,269 "Influencing Device Comprising a Diagnosis Unit for Influencing an Active Suspension System of a Vehicle" both of which are filed on even date herewith and the entire disclose of which is herein expressly incorporated by reference.

BACKGROUND AND SUMMARY OF THE INVENTION

The invention relates to an influencing device for influencing an active chassis system of a vehicle, the active chassis comprising a plurality of controllable spring or damper units of the vehicle, comprising a roadway sensor which produces sensor data relating to a roadway which is located in front of the vehicle in the direction of travel, said sensor data being used to acquire a roadway profile, wherein a pilot control unit determines, as a function of the acquired roadway profile, a pilot control variable which is used to adapt the setting of the spring or damper units to the acquired roadway profile.

U.S. Pat. No. 6,233,510 B1 discloses a method and a device for determining the state of a roadway and influencing the spring units of the vehicle as a function of the determined state of the roadway. A sensor—for example laser sensor or an image detection sensor—senses the surface of the roadway in front of the vehicle and transmits the sensor data to a control unit which determines the profile of the roadway located in front of the vehicle in the direction of travel. An active chassis system comprising a plurality of spring or damper units is actuated by the control unit as a function of this roadway profile, and performs open-loop or closed-loop control on the spring rate, the damping rate, the pressure, the level etc.

Exemplary embodiments of the present invention provide an influencing device for influencing an active chassis system of a vehicle that improves driving comfort for the vehicle occupants.

The influencing device has a roadway sensor which produces sensor data relating to a roadway located in front of the vehicle in the direction of travel, from which data it is possible to determine a roadway profile which is transmitted to a pilot control unit. The pilot control unit determines, as a function of the roadway profile, a pilot control variable which is used to adapt the setting of the spring or damper units to the acquired roadway profile. On the basis of the pilot control variable, an input variable is for this purpose calculated for a vehicle body control system which is used to perform z control of the position of the vehicle body. For example, the input variable which is acquired using the pilot control variable for the vehicle body control system can modify a setpoint value which is predefined in the vehicle body control system, and as a result can bring about the setting of the active chassis system or of the vehicle to the previously determined roadway profile. The actuation of the spring or damper units as a function of the roadway profile is consequently integrated into a vehicle body control system for controlling the position of the vehicle body.

This ensures that outside the effective range of the pilot controller or when the pilot controller is defective sufficient driving comfort is always ensured, and in such cases the position or the movement of the vehicle body is still controlled using the vehicle body control system. The vehicle body control system which is superimposed on the pilot controller therefore ensures very good driving comfort even when there are faults in the pilot controller.

The pilot control unit advantageously determines a plurality of separate pilot control variables, in particular a pilot control level for each spring or damper unit which is used to acquire a setpoint level of the respective spring or damper unit, and a pilot controller vehicle body position which is used to influence a vehicle body position controller of the vehicle body control system. As a result of this measure, a plurality of degrees of freedom are available for the modification of the vehicle body control system, with the result that the vehicle body control system can very easily be adapted to predefinable conditions or parameters, such as for example the frequency of the roadway excitations which are known by virtue of the acquired roadway profile and which act on the vehicle. The pilot control level can be determined separately for each vehicle wheel here.

In this context, at least the pilot control level can be converted, in a modification stage into a modified pilot control level taking into account predefined properties of the vehicle body control system, and can be used to determine the setpoint level for the spring or damper units. In this way, it is possible to adapt the pilot control level to the system limits or dynamic properties of the vehicle body control system. In particular, the modification stage is embodied as a system dynamics stage, and it determines a dynamics-optimized pilot control level from the pilot control level, wherein the dynamics-optimized pilot control level takes into account the dynamic behavior of the active chassis system of the vehicle.

It is also advantageous if the setpoint level for a spring or damping unit is determined on the basis of the pilot control level and/or a modified pilot control level which is formed therefrom, as well as an output variable of the vehicle body position controller. As a result, simple adaptation of the setpoint level to the acquired roadway profile which is located in front of the vehicle is possible.

Since the pilot control vehicle body position is used to correct an actual state value, fed back to the vehicle body position controller, of the vehicle, improved interaction between the vehicle body control system and the pilot controller can be achieved. In particular, in this context instead of the actual vehicle body position, a vehicle body position which is corrected using the pilot control vehicle body position can be fed to the vehicle body position controller, and/or instead of the actual vehicle body vertical speed can be a vehicle body vertical speed which is corrected using the derivative of the pilot control vehicle body position over time can be fed to the vehicle body position controller. Consequently, it is ensured that the vehicle body position controller does not try to compensate the change in the position of the vehicle body which is possibly brought about by the pilot controller.

The vehicle body control system can have a chassis controller which in turn has the active chassis system with the adjustable spring or damper units which can each contain an adjustable spring and/or an adjustable damper. A pilot control level which is used to influence the actual level of the adjustable spring is determined if an adjustable spring is provided in the spring or damper unit. A damping variable which is used to influence the damping effect of the adjustable damper is determined if an adjustable damper is provided in the spring or damper unit. Consequently, the pilot controller can be integrated into the vehicle body control system comprising an active chassis which has adjustable springs or adjustable dampers or even both.

It is also advantageous if a calculated wheel position which is transmitted to the pilot control unit as an input variable is acquired from the acquired roadway profile in a wheel movement acquisition stage. In this context, in particular the dynamic properties of the vehicle wheel can be taken into account. The pilot control is more precise as a result of the calculated wheel position being taken into account, which further increases the achieved comfort. At least one of the pilot control variables can be acquired as a function of the calculated wheel position.

It is also advantageous if a contour profile describing a position path from a plurality of vehicle body positions for the travel of the vehicle along the roadway profile is acquired on the basis of a variable which describes the roadway profile, wherein the curvature of the contour profile is minimized under the peripheral condition that the maximum spring travel values available at the spring or damper units are complied with. This ensures the greatest possible degree of comfort while taking into account the fact that, depending on the roadway profile, it is not always possible to compensate for all the elevations or depressions in the roadway using the active chassis systems without an effect on the position of the vehicle body.

It is possible for the vehicle body control system to be influenced by the pilot control variable or modified pilot control variable in such a way that the position of the vehicle body when there are roadway excitations in a lower frequency range below a lower cutoff frequency essentially follows the roadway profile. In this lower frequency range, changes in the roadway profile are converted into corresponding changes in position of the vehicle body, which permits a simple implementation possibility for optimizing the comfort while allowing for the system limits.

The lower cutoff frequency may be variable in this context and may depend on a variable which describes the roadway profile, in particular on the acquired, conditioned roadway profile. In addition, the lower cutoff frequency can depend on the maximum spring travel values which are respectively available at the spring or damper units. Since the lower cutoff frequency is minimized under the peripheral condition that the maximum spring travel values available at the spring or damper units are maintained when traveling along the roadway profile which is located in front of the vehicle, it is easily possible to achieve the greatest possible level of comfort while allowing for the system limits, in particular the spring travel limits. The curvature of the contour profile can be minimized very easily while complying with the maximum spring travel values available at the spring or damper units.

In this context, the vehicle body control system can control the position of the vehicle body when there are roadway excitations with frequencies above the lower cutoff frequency with the objective of maintaining the position of the vehicle body essentially unchanged so that a high level of comfort is provided in the region of frequencies above the lower frequency range. In this frequency range, roadway excitations are not to act on the position of the vehicle body. This applies up to an upper cutoff frequency of approximately 8-10 Hz which corresponds to the dynamic limit of the active chassis system.

It is also advantageous to provide a diagnostic unit which acquires a deviation between the anticipated state of the vehicle and the actual, current state of the vehicle on the basis of a variable which describes the roadway profile and a variable which describes the current state of the vehicle. In this way, control errors or else system defects can be detected.

The diagnostic unit acquires the anticipated state of the vehicle on, for example, the basis of the acquired roadway profile, in particular using a predefined vehicle model.

It is also possible for the diagnostic unit to acquire, on the basis of the deviation, a correction value which is used to adapt the pilot control variable and/or the modified pilot control variable. As a result of this configuration it is possible, at least partially, to adapt the influencing device to external conditions and compensate, for example, wear states of the active chassis system or changed dynamics of the vehicle body control system due to temperature fluctuations.

Other objects, advantages and novel features of the present invention will become apparent from the following detailed description of one or more preferred embodiments when considered in conjunction with the accompanying drawings.

BRIEF DESCRIPTION OF THE DRAWING FIGURES

Figure 2:
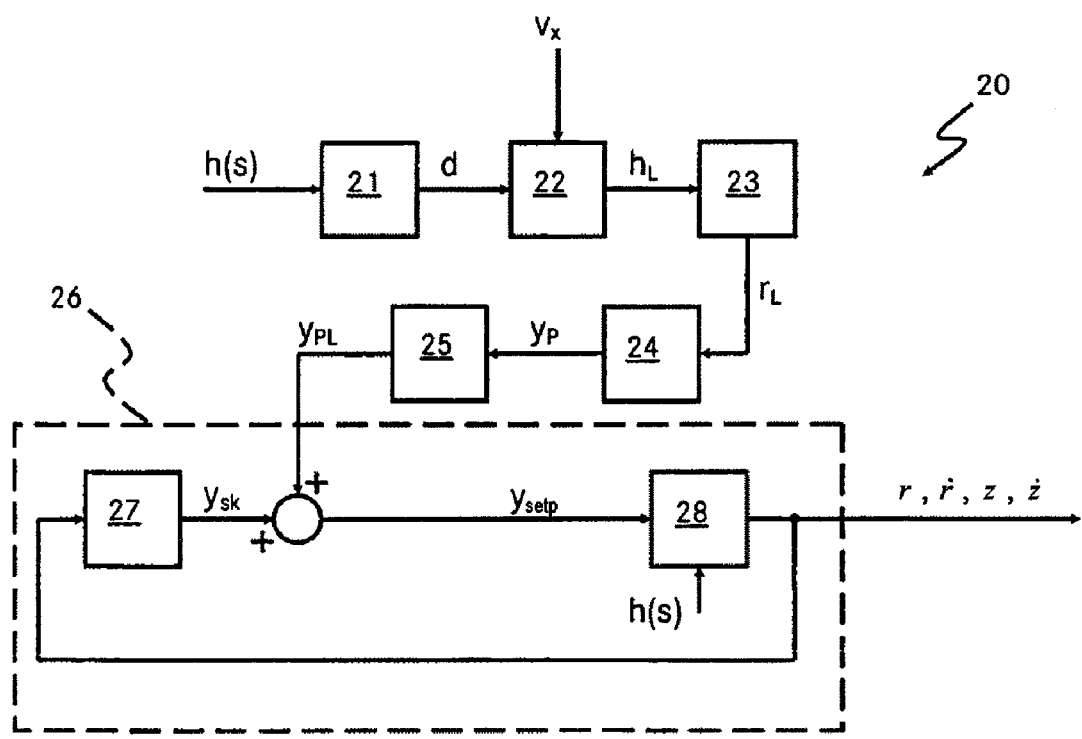
Figure 3:
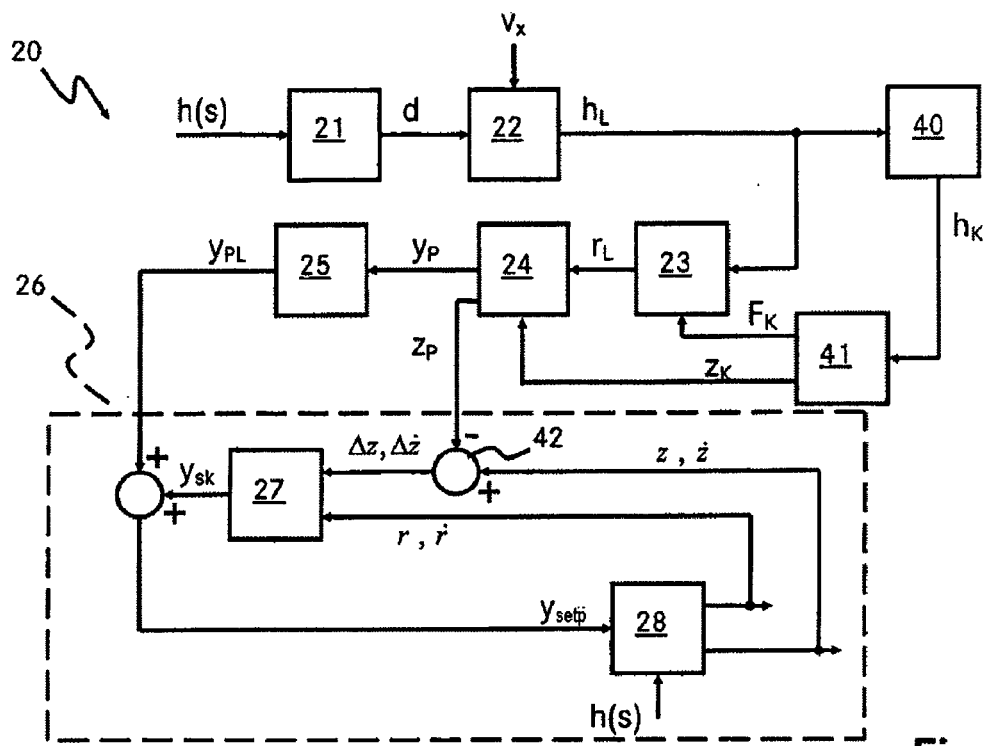
Figure 4:
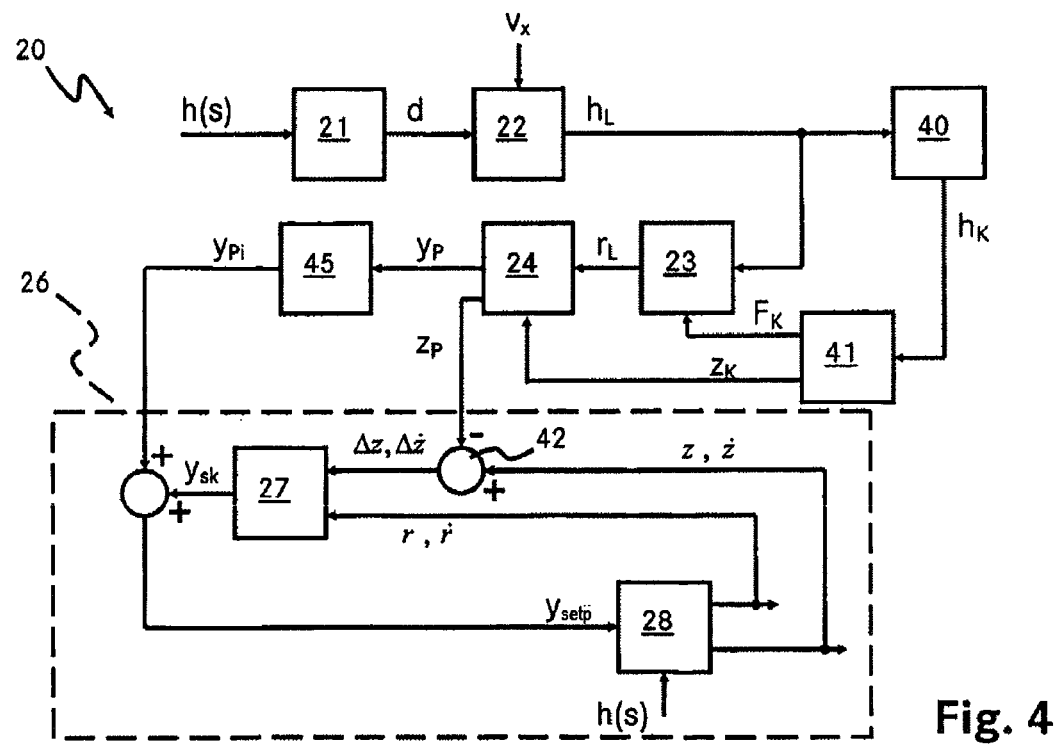
Figure 5:
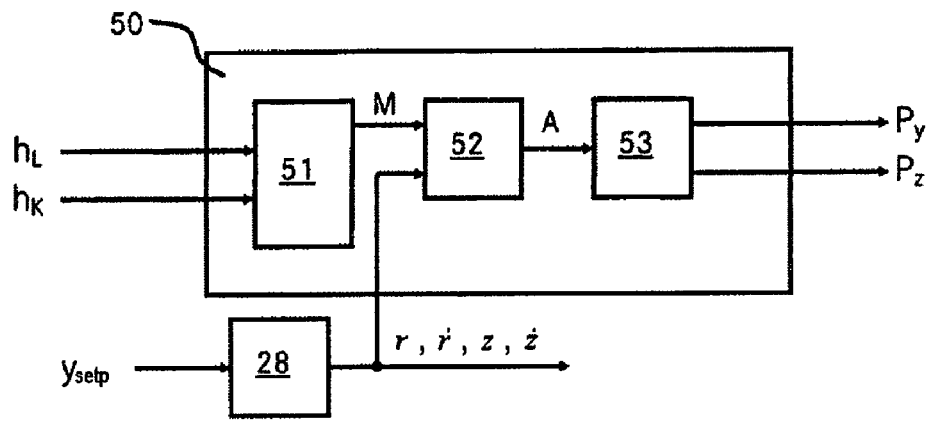
Figure 6A:
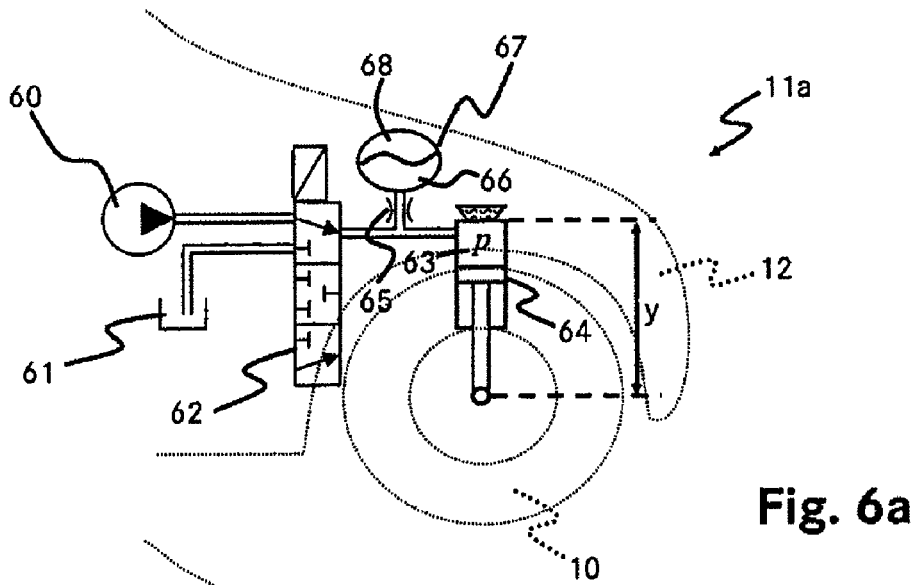
Figure 6B:
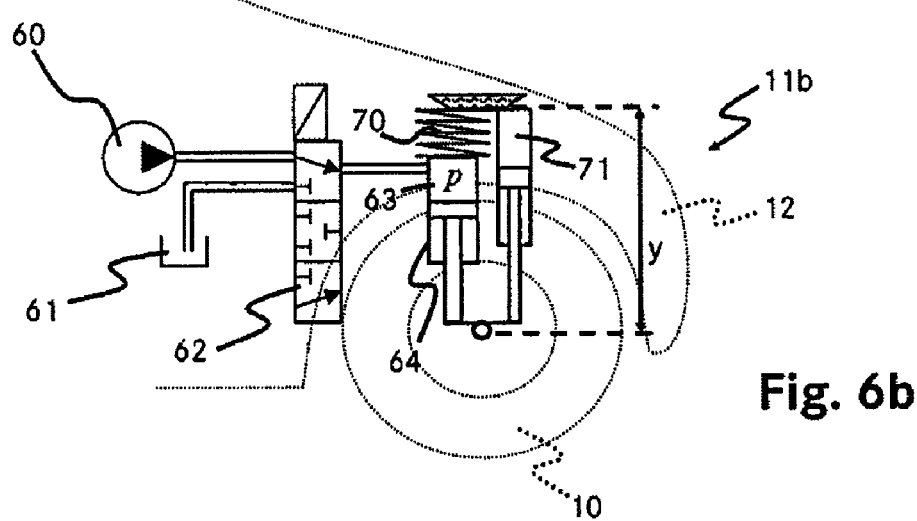

The invention will be explained in more detail below with reference to the appended drawing, in which:

FIG. 1 is a schematic illustration of a partial vehicle model comprising a wheel, spring or damper unit and vehicle body, FIG. 2 shows a first embodiment of the influencing device in a schematic block-circuit-diagram-like illustration, FIG. 3 shows a second embodiment of the influencing device in a schematic block-circuit-diagram-like illustration, FIG. 4 shows a fourth embodiment of the influencing device in a schematic, block-circuit-diagram-like illustration, FIG. 5 shows a diagnostic unit of the influencing device in a schematic, block-circuit-diagram-like illustration, FIG. 6a shows a schematic partial illustration of a first active chassis system with a spring or damper unit, and FIG. 6b shows a schematic partial illustration of a second active chassis system with a spring or damper unit.

DETAILED DESCRIPTION OF THE DRAWING FIGURES

FIG. 1 is a schematic illustration of a partial vehicle model, comprising a vehicle wheel 10, the controllable spring or damper unit 11 which is assigned to this vehicle wheel 10, and the vehicle body 12 which is illustrated as a mass and which has a vehicle center of gravity 13. The partial vehicle model illustrates only the part of the entire vehicle which relates to one of the vehicle wheels 10, and it applies, for example in the case of a passenger car with two axles, to each of the four vehicle wheels 10 and to the four spring or damper units 11.

This partial vehicle model is related to a fixed coordinate system 14. The actual roadway profile of the roadway is characterized by h(s), wherein the travel s represents the abscissa of the coordinate system 14, and the roadway profile h(s) is measured in the direction of the vertical axis of the vehicle. The position of the vehicle wheel 10 in the direction of the vertical axis of the vehicle is denoted as r, and the vehicle body position of the center of gravity 13 of the vehicle is provided, viewed in the direction of the vertical axis of the vehicle, with the reference symbol z. The distance between the position z of the vehicle body 12 and the position r of the vehicle wheel 10 is denoted by the reference symbol x and is defined here as $$x = z - r \quad \text{(equation 1)}$$

Finally, in FIG. 1 the reference symbol y denotes the current actual level of the spring or damper unit 11 which can be set or changed by actuating an actuator 11' of the spring or damper unit 11.

The roadway profile h can be different for each side of the vehicle and, if appropriate, for each vehicle wheel 10. The positions r of the vehicle wheels 10 and the actual levels y can differ at all the spring or damper units 11 or the vehicle wheels 10. These variables are therefore acquired and respectively set separately for each of the spring or damper units 11.

Using an influencing device 20 it is possible for the active spring or damper units 11 which are assigned to the vehicle wheels 10 of a vehicle (not illustrated in more detail) to be actuated independently of one another in order to influence the respective distance x between the position z of the vehicle body 12 and the assigned vehicle wheel 10 or the respective actual level y.

The vehicle body position z and/or the movement of the vehicle body 12 can be influenced and/or controlled in three dimensions. Accordingly, the pitching and/or the reciprocating movement as well as the wheel contact forces of the vehicle wheels on the roadway surface can be influenced, or subjected to open-loop or closed-loop control. As a result, it is also possible to tension the chassis, for example between the front and rear axles of the vehicle, in particular, the wheel contact forces of two vehicle wheels which lie diagonally opposite one another can be increased or decreased compared to the wheel contact forces of the other two vehicle wheels which lie diagonally opposite one another. In this way, the lateral-dynamics behavior of the vehicle can be influenced.

FIGS. 6a and 6b show schematically two examples of active chassis systems on the basis of a vehicle wheel 10 in a partial illustration. In the figures, active spring or damper units 11a and 11b, respectively, are provided with adjustable springs as spring or damper unit 11. Alternatively or additionally it would also be possible to use active spring or damper units 11 with adjustable dampers.

FIG. 6a shows an active hydro-pneumatic spring or damper unit 11a with a pressure source 60 and a reservoir vessel 61 which are each fluidically connected to an electrically controllable spring valve 62. Depending on its valve position, the spring valve 62 can either fluidically connect the pressure source 60 or the reservoir vessel 61 to a pressure space 63 of a piston/cylinder unit 64, which constitutes the actuator 11' of the hydro-pneumatic spring or damper unit 11a, or can disconnect all the fluid connections, with the result that the actual level y of the hydro-pneumatic spring or damper unit 11a can be increased, decreased or kept constant. A working space 66 of a pressurized gas vessel 67 is connected to the pressure space 63 via a throttle 65. The working space 66 is separated from a pressurized gas space 68 by a flexible diaphragm. The compressible pressurized gas in the pressurized gas space 68 ensures that the spring effect occurs at the hydro-pneumatic spring unit 11a. The throttle 65 brings about damping. The piston/cylinder unit 64 and the pressurized gas vessel 67 constitute the adjustable springs 64, 67.

A further form of an active spring or damper unit 11 of an active chassis system is shown in FIG. 6b, which can be referred to as an active body control (ABC) spring unit 11b. Identical components compared to the hydro-pneumatic spring unit 11a are provided with the same reference symbols. In contrast to the hydro-pneumatic spring unit 11a, the ABC spring unit 11b does not have a pressurized gas vessel 67. The ABC spring unit 11b has a series arrangement of a helical spring 70 with the piston/cylinder unit 64, in which case this series circuit forms the adjustable spring 64, 70 of the spring or damper unit 11b. A separate damper 71 is provided parallel to this adjustable spring 64, 70. As in the case of the hydro-pneumatic spring unit 11a, the pressure space 63 of the piston/cylinder unit 64 can be filled, emptied or blocked off using the spring valve in order to set the actual level y of the ABC spring unit 11b to a set point level $y_{setp}$.

A first exemplary embodiment of the influencing device 20 is illustrated in FIG. 2 in the form of a block circuit diagram. The influencing device 20 controls the active spring or damper unit 11 as a function of the state of the roadway in front of the vehicle in the direction of travel of the vehicle. In this way, the spring or damper units 11 can already be set to roadway excitations in front of the vehicle such as potholes, sills, cross channels etc. even before the vehicle has reached the position on the travel distance s with the roadway excitation. In order to detect the roadway profile which describes the roadway excitation, the influencing device 20 has a roadway sensor 21 which observes the roadway surface in front of the vehicle, viewed in the direction of travel, and transmits sensor data d which describes the roadway profile to a data conditioning unit 22.

The conditioned roadway profile $h_L$ is determined in the data conditioning unit 22 from the roadway sensor data d. For the acquisition of the conditioned roadway profile $h_L$, the current vehicle longitudinal velocity $v_x$ and further state data such as, for example, the current vehicle body position z or the actual levels y of the spring or damper units 11 are also fed to the data conditioning unit 22. Consequently, the position and orientation of the roadway sensor 21 is known, with the result that precise determination of the roadway profile becomes possible. Furthermore, portions of roadway excitations, described by the sensor data d, with a frequency above a predefinable upper cutoff frequency of, for example, 8-10 Hz are filtered out in the data conditioning unit 22. The conditioned roadway profile $h_L$ is provided as an output signal by the data conditioning unit 22.

The resulting vertical movements of the vehicle wheels 10 are acquired from the conditioned roadway profile $h_L$ in a wheel movement acquisition stage 23, and a low-frequency, calculated wheel position $r_L$ is therefore determined for each vehicle wheel on the basis of the following equation:

$$m_R \cdot \ddot{r}_L = c_R(h_L - r_L) k_R(\dot{h}_L - \dot{r}_L), \quad \text{(equation 2)}$$

where $m_R$ is the mass of the respective vehicle wheel 10, $c_R$ is a wheel vertical spring constant, $k_R$ is a wheel vertical damping constant and $\dot{r}_L$ is the calculated wheel vertical speed (the derivative of the calculated wheel position $r_L$ over time), $\ddot{r}_L$ is the calculated wheel vertical acceleration (the derivation of the calculated wheel vertical speed $\dot{r}_L$ over time) and $\dot{h}_L$ is the conditioned change in the roadway profile (the derivative of the conditioned roadway profile $h_L$ over time).

In an alternative, simple embodiment variant, the calculated wheel position $r_L$ could also be calculated from the sum of the conditioned roadway profile $h_L$ and a constant which gives the radius of the vehicle wheel 10, wherein the vertical spring or damping properties of the vehicle wheel 10 would be ignored.

The influencing device 20 also has a pilot control unit 24 which acquires, on the basis of the respective calculated wheel position $r_L$, a pilot control signal which is then used for controlling the position and/or movement of the vehicle body 13 and/or for controlling the actual level y of the spring or damper units 11 of the vehicle.

In the first exemplary embodiment of the influencing device 20, in each case a pilot control level $y_P$ is acquired as a pilot control signal for each spring unit 11. For example, the following relationship is obtained for the pilot control level $y_P$ of the respective vehicle wheel 10 as a function of the active chassis system used:

$$y_P = -r_L - \frac{k_F}{c_F} \dot{r}_L, \qquad \text{(equation 3)}$$

where $c_F$ is a spring constant of the spring or damper unit 11, $k_F$ is a damper constant of the spring or damper unit 11 and the calculated wheel vertical speed $\dot{r}_L$ is the derivative of the calculated wheel position $r_L$ over time. This applies on condition that the vehicle body 12 is also to remain at rest when there are low frequency excitations below a lower cutoff frequency of, for example, 0.5 Hz.

The filtered pilot control level $y_{PL}$ is then formed from the pilot control level $y_P$ in a pilot control dynamics filter 25:

$$\sum_{i=0}^{N-1} b_i y_{PL}^{(i)} = \sum_{i=0}^{N} a_i y_P^{(i)} \qquad \text{(equation 4)}$$

The procedure for determining the filter coefficients $a_i$ and $b_i$ of the pilot control dynamics filter 25 is known per se from filter design methods and is also explained briefly below.

The filtered pilot control level $y_{PL}$ is finally transmitted to a vehicle body control system 26 which controls the vehicle body position z on the basis of a predefined vehicle body position setpoint value $z_{setp}$, in particular $z_{setp}$=constant in this context. In the preferred exemplary embodiment, this vehicle body control system 26 has a skyhook controller 27 and a chassis controller 28. The current wheel position r and the current wheel vertical speed $\dot{r}$ for each of the vehicle wheels 10 and the current vehicle body position z and its derivative over time, the current vehicle body vertical speed $\dot{z}$ are predefined as input variables to the skyhook controller 27.

The skyhook controller 27 acquires, from said input variables, a skyhook level $y_{sk}$ for each spring or damper unit 11 in order to move the vehicle body 12 into its predefinable desired position, in which case the following applies:

$$y_{sk} = \left( \frac{c_S(r-z) - k_S \cdot \dot{z} + F_e - c_F(r-z) - k_F(\dot{r}-\dot{z})}{c_F} \right), \qquad \text{(equation 5)}$$

where $c_S$ is a skyhook spring constant and $k_S$ is a skyhook damper constant.

$F_e$ is here a skyhook restoring force according to the following relationships:

$$F_e = c_e x_e + k_e \dot{x}_e, \qquad \text{(equation 6)}$$

where $x_e$ represents a synthetic stop where $$x_e = \text{sign}(r-z) \begin{cases} (|r-z| - \Delta x_{max}) & \text{for } |r-z| > \Delta x_{max} \\ 0 & \text{otherwise} \end{cases} \qquad \text{(equation 7)}$$

$\Delta_{max}$ is a skyhook spring travel limitation, $c_e$ is a restoring spring constant and $k_e$ is a restoring damper constant which are predefined as a function of the desired skyhook controller behavior.

The setpoint level $y_{setp}$ is determined for each of the spring or damper units 11 from the respective skyhook level $y_{sk}$ and the respective filtered pilot control level $y_{PL}$ and transmitted to the chassis controller 28 for setting:

$$y_{setp} = y_{sk} + y_{PL} \qquad \text{(equation 8)}$$

The filter coefficients $a_i$ and $b_i$ of the pilot control dynamics filter 25 can be acquired as follows: The transmission behavior of the chassis controller 28 can be determined using measurements. In this way it is known which transmission dynamics the pilot control level $y_P$ would experience without the pilot control dynamics filter 25. A filter which is as accurate as possible with respect to amplitudes and does not cause any phase delays up to the highest possible frequency is now designed on the basis of known filter design methods. For example, in the simplest case a PD element can be used with a proportional gain factor KP=1.

The integration of the pilot control of the active spring units 11 into the vehicle body control system 26 ensures that sufficient driving comfort is always ensured outside the effective range of the pilot controller or when the pilot controller is defective—in such cases the position and/or the movement of the vehicle body 12 is always still controlled using the skyhook controller 27.

In the text which follows, a second exemplary embodiment of the influencing device 20, which is expanded compared to the first exemplary embodiment described above is explained. This second embodiment variant has, in addition to the first exemplary embodiment, a contour acquisition unit 40 and a vehicle body movement acquisition stage 41, as illustrated in FIG. 3.

In this second embodiment of the influencing device 20, the comfort is optimized taking into account the spring travel limits of the spring or damper units 11. The influencing device 20 knows the conditioned roadway profile $h_L$ up to a position of maximum sensor range $s_{max}$ in front of the vehicle. The actual levels y of the spring or damper units 11 are set in the section of the travel s in which the conditioned roadway profile $h_L$ is known, in such a way that the respective maximum available spring travel $\Delta z_{max}$ is complied with, and during the travel of the vehicle along the previously determined conditioned roadway profile the vehicle body position z moves along a position path with the smallest possible degree of curvature. In this way, the comfort potential is exploited to an optimum degree. The contour acquisition unit 40 acquires for this purpose a contour profile $h_K$ which describes the position path from a plurality of vehicle body positions for the travel of the vehicle along the predetermined, conditioned roadway profile $h_L$, wherein the curvature of the contour profile $h_K$ is minimized under the peripheral condition that the maximum spring travel values $\Delta z_{max}$ which are available at the spring or damper units 11 are respectively complied with.

Consequently, a contour profile $h_K$ which characterizes this position path is determined in the contour acquisition unit 40 as a function of the conditioned roadway profile $h_L$. For example, the determination of the contour profile $h_K$ is carried out in the contour acquisition unit 40 using, in particular phase-free, low-pass filtering of the conditioned roadway profile $h_L$. The cutoff frequency of this low-pass filtering is selected to be as small as possible here, under the condition that in this context the maximum available spring travel $\Delta z_{max}$ at each spring or damper unit 11 is complied with. It is to be noted at this point that the maximum available spring travel $\Delta z_{max}$ is of different sizes in the direction of the spring compression and in the direction of the spring extension of the respective spring or damper unit 11, and the values also change, depending on the actual levels of the individual spring or damper units 11. For this reason, a maximum spring compression travel value $\Delta z_{max}$, comp and a maximum spring extension travel value $\Delta z_{max,ext}$, which are combined as $\Delta z_{max}$ for the sake of clarity, must be taken into account at each spring or damper unit 11. The calculation method is in principle the same for both values.

In the preferred exemplary embodiment, the smallest possible cutoff frequency for the lowpass filtering operation is determined iteratively in the contour acquisition unit 40. Starting from a starting frequency, which may be for example 0 Hz, a lowpass filtering result TP is calculated and it is subsequently checked whether the peripheral condition of the maximum available spring travel values can be complied with:

$$|TP-h_L|<\Delta z_{max} \quad \text{(equation 9)}$$

If the condition according to equation 9 is met, the contour profile $h_K$ corresponds to the lowpass filtering result TP. If this condition is not met or if the maximum available spring travel values $\Delta z_{max}$ are reached or exceeded, the starting frequency is increased and a new lowpass filtering result TP is calculated. This iteration loop is run through until a lowpass filtering result TP which meets the peripheral condition given in equation 9 has been obtained. The contour profile $h_K$ which is acquired in this way is then transmitted to the vehicle body movement acquisition stage 41.

The vehicle body movement acquisition stage 41 calculates a contour vehicle body position $z_K$ and a contour force $F_K$ from the contour profile $h_K$ as follows:

$$z_K = h_K \quad \text{(equation 10)}$$

$$F_K = \frac{\ddot{h}_K}{m_A} \quad \text{(equation 11)}$$

The contour force $F_K$ is fed to the wheel movement acquisition stage 23 which determines the calculated wheel position $r_L$ in this second exemplary embodiment on the basis of the equation:

$$m_R \cdot \ddot{r}_L = c_R(h_L - r_L) - F_k k_R(\dot{h}_L - \dot{r}_L), \quad \text{(equation 12)}$$

wherein $m_R$ is the mass of the wheel 10 and $\dot{h}_L$ is the derivative over time of the conditioned roadway profile $h_L$.

The calculated wheel position $r_L$ and the contour vehicle body position are fed to the pilot control unit 24. In this second embodiment of the influencing device 20, the pilot control unit 24 acquires, in addition to the pilot control levels $y_P$ for the individual spring or damper units 11, a pilot control vehicle body position $z_P$ as a further pilot control variable which is passed on to the vehicle body control system 26. The pilot control variables are obtained as follows:

$$y_P = \frac{F_L}{c_F} - (r_L - z_P) - \frac{k_F}{c_F}(\dot{r}_L - \dot{z}_P) \quad \text{(equation 13)}$$

$$z_P = z_K \quad \text{(equation 14)}$$

Corrected state values $\Delta z, \Delta \dot{z}$ are used for the calculation of the skyhook level $y_{sk}$ in order to improve the compatibility of the pilot control by the pilot control unit 24 and the vehicle body control system 26. This ensures that the vehicle body control system 26 and, for example, the skyhook controller 27 do not consider the pilot control levels $y_P$ to be added to the skyhook levels $y_{sk}$ to be interference variables and at least partially compensate them again. The corrected state values are obtained as follows:

$$\Delta z = z - z_P \quad \text{(equation 15)}$$

$$\Delta \dot{z} = \dot{z} - \dot{z}_P \quad \text{(equation 16)}$$

The calculation of the corrected state values $\Delta z, \Delta \dot{z}$ is carried out in a difference stage 42.

The pilot control vehicle body position $z_P$ which is acquired in the skyhook controller 27 is therefore obtained as:

$$y_{sk} = \left( \frac{c_S(r-(z-z_P)) - k_S \cdot \dot{z} + F_e -}{c_F} \right) \quad \text{(equation 17)}$$

In this context, equations 6 and 7 apply to the skyhook restoring force $F_e$, as in the first exemplary embodiment.

Finally, as in the first exemplary embodiment of the influencing device 20 the setpoint levels $y_{setp}$ of the individual spring units 11 are calculated on the basis of equation 8:

$$y_{setp} = y_{sk} + y_{PL} \quad \text{(equation 8)}$$

The integrated pilot control and vehicle body control can be improved further if the skyhook controller 27 determines a skyhook correction term $y_{skk}$, which is added to the skyhook level $y_{sk}$ and to the filtered pilot control level $y_{PL}$:

$$y_{skk} = \left( \frac{c_F - c_S}{c_F} r_L + \frac{k_F}{c_F} \dot{r}_L \right) \quad \text{(equation 18)}$$

Instead of equation 8 the following is then obtained:

$$y_{setp} = y_{sk} + y_{PL} + y_{skk} \quad \text{(equation 8')}$$

FIG. 4 shows a further, third embodiment of the influencing device 20. Instead of the pilot control dynamics filter 25, a system dynamics stage 45 is provided which, while determining a dynamics-optimized pilot control level $y_{Pi}$—passed on to the vehicle body control system 26—on the basis of the pilot control level $y_P$ takes into account the system behavior of the active chassis system, in particular its timing behavior or dynamic behavior during the setting of the pilot control variables. Otherwise, this third embodiment corresponds to the second embodiment of the influencing device 20. Instead of the filtered pilot control level $y_{PL}$ of the second embodiment, the dynamics-optimized pilot control level $y_{Pi}$ is now determined from the pilot control level $y_P$ of the pilot control unit 24:

$$\sum_{i=0}^{N-1} u_i y_{Pi}^{(i)} = \sum_{i=0}^{N} w_i y_P^{(i)} \quad \text{(equation 19)}$$

The coefficients $u_i$ and $w_i$ can be determined by the transmission behavior of the active chassis system used in the vehicle and consequently differ in different types of vehicles. This transmission behavior can be acquired using measurements.

For example, the transmission behavior between the setpoint level $y_{setp}$ and the actual level y of a spring or damper unit 11 of an active chassis system with ABC spring or damper units 11b—cf. FIG. 6b—can be specified as follows:

$$\ddot{y} + 2D_v\omega_v\dot{y} + \omega_v(2D_F\omega_F q_z + \omega_v(1-q_z))\dot{y} + \omega_v\omega_F^2 q_z y = q_z\omega_v\omega_F^2 y_{setp} + q_z\omega_v(2D_F\omega_F - \omega_V)\dot{y}_{setp} \quad \text{(equation 20)}$$

where:
$D_V$ valve damping of a control valve of the spring unit 11;
$\omega_V$ valve cutoff frequency
$D_F$ position control damping
$\omega_F$ position control cutoff frequency
$q_Z$ constant of the spring unit 11 which describes the influence of the pressure The transmission function G of the active chassis system can then be acquired from this differential equation using $$y = G \cdot y_{setp} \quad \text{(equation 21)}$$

If the inverse transmission function $G_{inv}$ is calculated from this, the relationship between the pilot control level $y_P$ and the dynamics-optimized pilot control level $y_{Pi}$ is obtained:

$$y_{Pi} = G_{inv} \cdot y_P \quad \text{(equation 22)}$$

This provides the coefficients $u_i$ and $w_i$ in the approach according to equation 19 which can then be used as a computational implementation of the inverse transmission function $G_{inv}$. This procedure is analogous to the determination of the filter coefficients of the pilot control dynamics filter 25 in the first two embodiments of the influencing device 20.

The pilot control which is achieved using the pilot control unit 24 can be used for all active chassis with which vehicle body control can be carried out.

The above is a description of the application, in particular, with active chassis with adjustable springs 64, 67 and 64, 70, respectively. However, it is also possible for the damping characteristic of one or more settable dampers of an active chassis system to be changed, for the purpose of controlling the vehicle body position, in such a way that undesired vehicle body movements due to an increase or decrease in the damping effect are prevented. For this purpose, the described exemplary embodiments of the influencing device 20 can be modified. By using the acquired level variables for the spring units 11 it is possible to acquire a variable damping effect which is changed by the pilot control unit 24 using the knowledge of the roadway profile in front of the vehicle. This can be done as follows:

The following equation for a spring or damper unit 11 with a settable damper is used as the starting point:

$$F_{CD} = c_F \cdot x + (k_F + \Delta k)\dot{x} \quad \text{(equation 23)}$$

where:
$F_{CD}$: spring force
x: difference between the wheel position and vehicle body position
$c_F$: spring constant of the spring
$k_F$: damping constant of the damper
$\Delta k$: settable damping variable The following applies to a spring or damper unit 11 with a variable level of the spring:

$$F_{CD} = c_F(x+y) + k_F(\dot{x}+\dot{y}) \quad \text{(equation 24)}$$

Equations 23, 24 and 1 provide the settable damping variable:

$$\Delta k = \frac{cF \cdot y + kF \cdot \dot{y}}{\dot{x}} \quad \text{(equation 25)}$$

On the basis of the equation 25, the actual level y, the setpoint level $y_{setp}$, the pilot control level $y_P$, the filtered pilot control level $y_{PL}$ and the dynamics-optimized pilot control level $y_{Pi}$ can be converted into a respectively corresponding value for the damping variable. For example, the pilot control unit 24 can determine a pilot control damping value $\Delta k_P$, and the skyhook controller 27 can determine a skyhook damping value $\Delta k_{sk}$, from which a damping setpoint value $\Delta k_{setp}$ can then also be acquired. For the third embodiment of the influencing device 20 the following applies, for example:

$$\Delta k_{sk} = \frac{cF \cdot y_{sk} + kF \cdot \dot{y}_{sk}}{\dot{r} - \dot{z}} \quad \text{(equation 26)}$$

$$\Delta k_P = \frac{cF \cdot y_P + kF \cdot \dot{y}_P}{\dot{r}_L - \dot{z}_K} \quad \text{(equation 27)}$$

The dynamics-optimized pilot control damping $\Delta k_{Pi}$ arises, in a way which is analogous to the filtering of the pilot control level, from the pilot control damping $\Delta k_P$ as described above. Finally, the setpoint damping can be acquired from $$\Delta k_P = \Delta k_{Pi} + \Delta k_{sk} \quad \text{(equation 28)}$$

In this way, the pilot controller can be integrated into the vehicle body control system if a spring or damper unit 11 with a settable damper is used. This also applies correspondingly to all the other described exemplary embodiments of the influencing device 20.

As a result of determining in advance the roadway profile h in front of the vehicle in the direction of travel, the roadway excitations which act on the vehicle wheels 10 at a specific time are also known. For this reason it is possible to predict the vehicle behavior at any time on the basis of a model and to compare said behavior with the actual vehicle behavior. In this way it is possible to detect deviations and/or faults. The pilot control can be corrected when deviations are detected, for example the pilot control variables $y_P$, $z_P$ of the pilot control unit 24 can be adapted to the current temperature or the state of wear of the vehicle.

For this purpose, the influencing device 20 has a diagnostic unit 50. On the one hand, measured vehicle variables which describe the behavior or the state of the vehicle are fed to the diagnostic unit 50, and on the other hand one or more variables which describe the roadway profile h (s), for example the conditioned roadway profile $h_L$ and/or the contour profile $h_K$, are fed to the diagnostic unit 50.

In a first diagnostic stage 51, model values M, in particular the following model values—the anticipated wheel position $r_M$, the anticipated wheel vertical speed $\dot{r}_M$, the anticipated vehicle body position $z_M$ and/or the anticipated vehicle body vertical speed $\dot{z}_M$—are acquired using a vehicle model from the variables $h_L$, $h_K$ which describe the roadway profile h (s).

These model parameters M are transmitted to a second diagnostic stage 52. The measured current chassis variables, for example the wheel position r, the wheel vertical speed $\dot{r}$, the vehicle body position z and/or the vehicle body vertical speed $\dot{z}$ are also fed into this second diagnostic stage 52.

The second diagnostic stage 52 compares the model parameters with the measured chassis variables and detects a deviation A which is passed on to a third diagnostic stage 53.

The third diagnostic stage 53 produces, on the basis of the detected deviation A, one or more correction signals which are used to correct the pilot control variables $y_P$, $z_P$ of the pilot control unit 24. In the embodiment of the diagnostic unit 50 which is described here, at least one, and for example a first correction factor $P_y$ and a second correction factor $P_z$ are determined and they are used to increase or decrease the pilot control variables $y_P$, $z_P$, as a function of the absolute value and sign of the deviation A. In the present case the following applies:

$$y_{P, corrected} = P_y \cdot y_P \quad \text{(equation 29)}$$

$$z_{P, corrected} = P_z \cdot z_P \quad \text{(equation 30)}$$

The diagnostic unit 50 can be used in all three embodiments of the influencing device 20 according to FIGS. 2 to 4. Instead of the pilot control variables $y_P$, $z_P$ the corrected pilot control variables $y_{P, corrected}$ and $z_{P, corrected}$ are respectively used here for the control operation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An influencing device for influencing an active chassis comprising a plurality of controllable spring or damper units of a vehicle, the influencing device comprising:
   a roadway sensor that produces sensor data relating to a roadway located in front of the vehicle in a direction of travel, said sensor data being used to acquire a roadway profile;
   a pilot control unit that determines, as a function of the acquired roadway profile, a pilot control variable that is used to adapt the setting of the spring or damper units to the acquired roadway profile, wherein an input signal for a vehicle body control system, which is used to control the position of the vehicle body, is calculated on the basis of the pilot control variable.

2. The influencing device as claimed in claim 1, wherein the pilot control unit determines a plurality of separate pilot control variables including
   a pilot control level for each spring or damper unit, the pilot control level is used to acquire a setpoint level of the respective spring or damper unit, and
   a pilot control vehicle body position which is used to influence a vehicle body position controller of the vehicle body control system.

3. The influencing device as claimed in claim 2, wherein at least the pilot control level is converted, in a modification stage into a modified pilot control level taking into account predefined properties of the vehicle body control system, and is used to determine the setpoint level for the spring units.

4. The influencing device as claimed in claim 3, wherein the modification stage is a system dynamics stage, and it determines a dynamics-optimized pilot control level from the pilot control level, wherein the dynamics-optimized pilot control level takes into account the dynamic behavior of the active chassis system of the vehicle.

5. The influencing device as claimed in claim 2, wherein the setpoint level for a spring or damping unit is determined on the basis of the pilot control level or a modified pilot control level that is formed therefrom, and an output variable of the vehicle body position controller.

6. The influencing device as claimed in claim 2, wherein the pilot control vehicle body position is used to correct an actual state value, fed back to the vehicle position controller, of the vehicle.

7. The influencing device as claimed in claim 6, wherein a vehicle body position that is corrected using the pilot control vehicle body position is fed to the vehicle body position controller or a vehicle body vertical speed that is corrected using the derivative of the pilot control vehicle body position over time is fed to the vehicle body position controller.

8. The influencing device as claimed in claim 1, wherein the vehicle body control system has a chassis controller that includes the active chassis system with the adjustable spring or damper units which can each have an adjustable spring or an adjustable damper.

9. The influencing device as claimed in claim 8, wherein a pilot control level which serves to influence the actual level of the adjustable spring is determined when an adjustable spring is provided in the spring or damper unit, and wherein a damping variable which serves to influence the damping effect of the adjustable damper is determined when an adjustable damper is provided in the spring or damper unit.

10. The influencing device as claimed in claim 1, wherein a calculated wheel position which is transmitted to the pilot control unit as an input variable is acquired from the acquired roadway profile in a wheel movement acquisition stage.

11. The influencing device as claimed in claim 10, wherein dynamic properties of the vehicle wheel are taken into account in the acquisition of the calculated wheel position.

12. The influencing device as claimed in claim 10, wherein at least one of the pilot control variables is acquired as a function of the calculated wheel position.

13. The influencing device as claimed in claim 1, wherein a contour profile describing a position path from a plurality of vehicle body positions for the travel of the vehicle along the roadway profile is acquired on the basis of a variable which describes the roadway profile, wherein the curvature of the contour profile is minimized under the peripheral condition that the maximum spring travel values available at the spring units are complied with.

14. The influencing device as claimed in claim 1, wherein the vehicle body control system is influenced by the pilot control variable or modified pilot control variable in such a way that the vehicle body position of the vehicle body when there are excitations of the roadway in a lower frequency range below a low cutoff frequency essentially follows the roadway profile.

15. The influencing device as claimed in claim 14, wherein the lower cutoff frequency is variable and depends on a variable which describes the acquired roadway profile.

16. The influencing device as claimed in claim 14, wherein the lower cutoff frequency is variable and depends on the maximum spring travel values which are respectively available at the spring units.

17. The influencing device as claimed in claim 13, wherein the vehicle body control system is influenced by the pilot control variable or modified pilot control variable in such a way that the vehicle body position of the vehicle body when there are roadway excitations with frequencies above the lower cutoff frequency remains essentially unchanged.

18. The influencing device as claimed claim 1, wherein a diagnostic unit acquires a deviation between an anticipated state of the vehicle and an actual, current state of the vehicle on the basis of a variable describing the roadway profile and a variable which describes the current state of the vehicle.

19. The influencing device as claimed in claim 18, wherein the diagnostic unit acquires the anticipated state of the vehicle on the basis of the conditioned roadway profile.

20. The influencing device as claimed in claim 18, wherein the diagnostic unit acquires, on the basis of the deviation, a correction value that is used to adapt the pilot control variable and/or the modified pilot control variable.

* * * * *